(12) United States Patent
Klish et al.

(10) Patent No.: US 10,248,959 B2
(45) Date of Patent: Apr. 2, 2019

(54) METHODS AND SYSTEMS FOR TARGETING USER INITIATED SOCIAL EVENTS

(75) Inventors: Aaron J. Klish, St. Joseph, IL (US); Greg Muchnik, Champaign, IL (US); Matthew Ahrens, Champaign, IL (US)

(73) Assignee: Excalibur IP, LLC, New York, NY (US)

(*) Notice: Subject to any disclaimer, the term of this patent is extended or adjusted under 35 U.S.C. 154(b) by 1106 days.

(21) Appl. No.: 13/273,722

(22) Filed: Oct. 14, 2011

(65) Prior Publication Data

US 2013/0097016 A1  Apr. 18, 2013

(51) Int. Cl.
*G06Q 30/00* (2012.01)
*G06Q 30/02* (2012.01)
*G06Q 50/00* (2012.01)
*G05B 19/418* (2006.01)

(52) U.S. Cl.
CPC ............. *G06Q 30/02* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 2007/0022437 A1* | 1/2007 | Gerken | ............. | H04N 7/17318 725/41 |
| 2007/0233291 A1* | 10/2007 | Herde | .................... | G06Q 10/02 700/91 |
| 2008/0059256 A1* | 3/2008 | Lynch | ................................ | 705/7 |
| 2009/0215469 A1* | 8/2009 | Fisher | .................. | H04L 12/588 455/456.3 |
| 2009/0254971 A1* | 10/2009 | Herz et al. | ........................ | 726/1 |
| 2010/0262464 A1* | 10/2010 | Monteforte | ........... | G06Q 10/00 705/7.29 |
| 2011/0119128 A1* | 5/2011 | Fang | ..................... | G06Q 30/02 705/14.49 |
| 2013/0024879 A1* | 1/2013 | Bruich | .................. | H04H 60/33 725/9 |

OTHER PUBLICATIONS

"Community-based applications". Emmanuel Marilly, Christophe Senot, Xavier Andrieu, Bertrand Boidart, Armen Aghasaryan, and Alexis Germaneau. Publication Date: Mar. 1, 2011. Bell Labs Technical Journal (vol. 15, Issue: 4, pp. 93-109). ISSN (Online): 1538-7305. (Year: 2011).*

* cited by examiner

*Primary Examiner* — Maria V Vanderhorst
(74) *Attorney, Agent, or Firm* — Mauriel Kapouytian Woods LLP; Lana Akopyan; James Woods (57) ABSTRACT

Techniques are provided which allow targeting social events. Methods and systems allow a user to register a social event which involves a group of users watching a program on a television on a social networking platform. Information related to the event may be obtained and the group of users may be classified as belonging to one or more targeting segments based at least in part on the information related to the event. One or more advertisements may be selected based at least in part on the one or more targeting segments. The one or more advertisements may be transmitted such that the one or more advertisements are displayed on the television.

18 Claims, 6 Drawing Sheets

METHODS AND SYSTEMS FOR TARGETING USER INITIATED SOCIAL EVENTS

BACKGROUND

Advertisers (including proxies, agents, or other entities acting on behalf of or in the interest of advertisers) compete for user attention. By effective referencing and use of topics of interest in their advertising, advertisers grab attention, build rapport with audiences, and increase brand cachet. For example, in maintaining distinctiveness and relevance, advertisers benefit from, among other things, knowledge of interests and trending interests of their target audiences.

One particular target audience of interest to advertisers is groups of users who are gathered at social events. There is a need for techniques for use in, among other things, providing advertisers and other entities with information relating to users who are gathered for a social event.

SUMMARY

Exemplary embodiments of the invention provide systems and methods which allow targeting of social events. In some embodiments, a user may be allowed to register an event on a social networking platform, wherein the event involves a group of users watching a program on a television. The user may register the event on a social networking platform (e.g., Facebook, Evite, etc.) in order to invite a group of friends to the event. For example, a user may register a superbowl viewing party on a social networking platform and invite a group of friends using the social networking platform. Information relating to the event may be obtained by for example, one or more advertiser computers. In some embodiments, the user may first be presented with an option to allow advertisers to target the event. The user may be presented with incentives in exchange for allowing advertisers to target the event. The user may be provided with, for example, cash, discounts, rewards points, coupons, etc. If the user agrees, information relating to the event, such as for example, date and time of the event, location of the event, the users who will be attending, the content to be watched at the event, etc. may be obtained.

The group of users may be classified as belonging to one or more targeting segments based at least in part on the information relating to the event. In some embodiments, the users may be classified into targeting segments such that one or more targeting segments represent all of the users in the group. In some embodiments, each user of the group may be classified into one or more individual targeting segments. Then, one or more shared targeting segments which are common among all of the users may be selected to represent the group of users. Alternatively, one or more users may be classified into one or more targeting segments. For example, only the host of the event may be classified into one or more targeting segments.

One or more advertisements may be selected based at least in part on the one or more targeting segments. For example, if the group includes users who all like video games, then video game advertisements may be selected. The one or more advertisements may be transmitted such that the one or more advertisements are displayed on the television. In some embodiments, the television may be a Connected TV or a Smart TV, which is configured to directly access the Internet. If so, the advertisements may be transmitted to the TV, and subsequently displayed on the TV. In some embodiments, the TV may be connected to a device such as for example, a set-top box or a gaming console which is configured to access the Internet. In such cases, the advertisements may be transmitted to the device (e.g., set-top box or gaming console), and subsequently displayed on the TV. The advertisements may be transmitted before, during or after the event, and may be displayed before, during or after the event.

DETAILED DESCRIPTION

Figure 1:
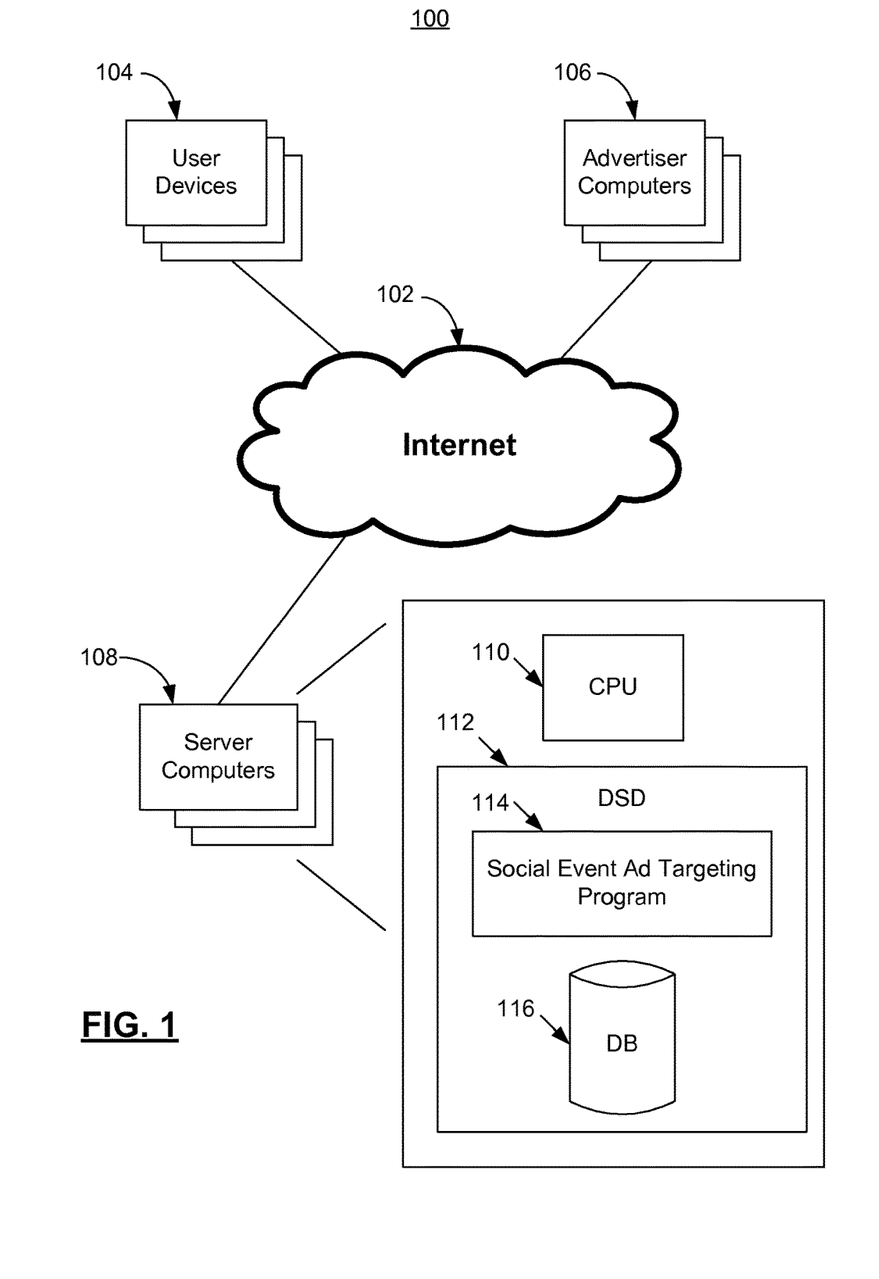
FIG. 1 is a distributed computer system according to one embodiment of the invention.

FIG. 1 is a distributed computer system 100 according to one embodiment of the invention. The system 100 includes user devices 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user devices 104 may be or include smart televisions (e.g., televisions with internet connectivity), non-smart televisions, set-top boxes, gaming consoles, desktop or laptop PCs, as well as, wireless, mobile, or handheld devices such as cell phones, PDAs, tablets, etc.

Each of the one or more computers 106 and 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Social Event Ad Targeting Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
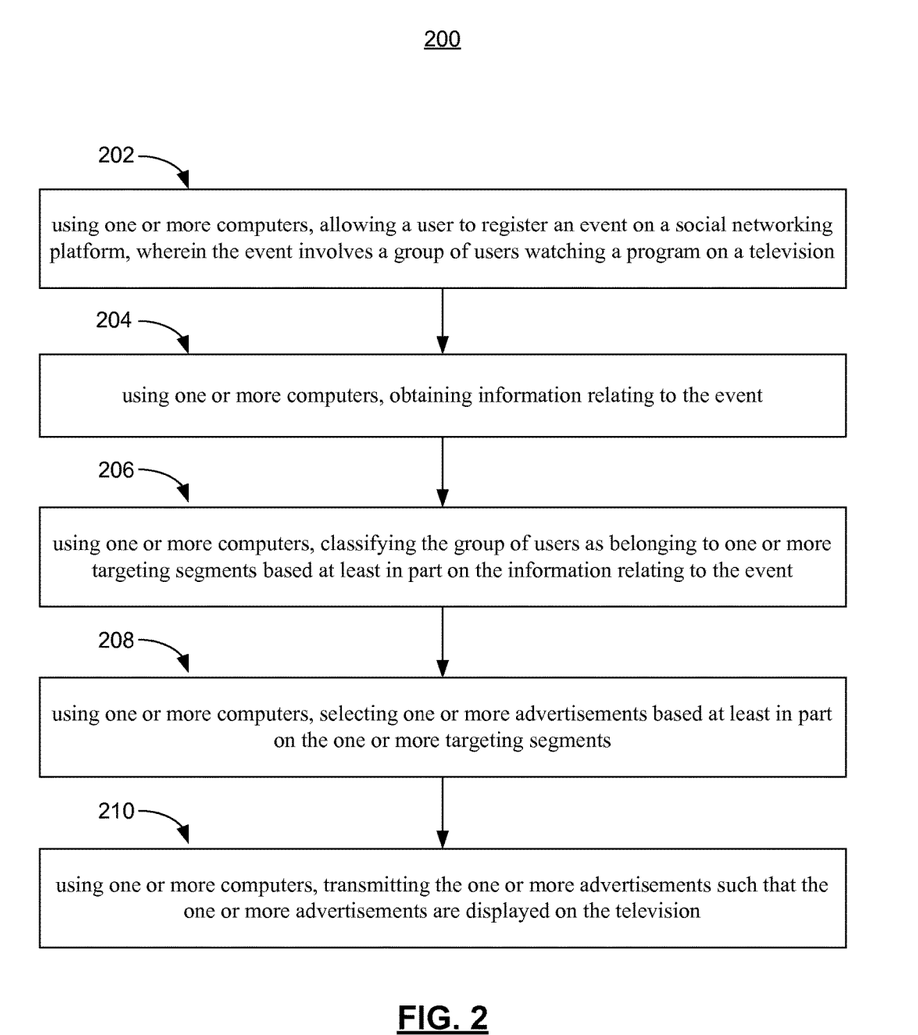
FIG. 2 is a flow diagram illustrating a method according to one embodiment of the invention.

FIG. 2 is a flow diagram illustrating a method 200 according to one embodiment of the invention. At step 202 using one or more computers, a user may be allowed to register an event on a social networking platform, wherein the event involves a group of users watching a program on a television. The user may register the event on a social networking platform (e.g., Facebook, Evite, etc.) in order to invite a group of friends to the event. For example, a user may register a superbowl viewing party on a social networking platform and invite a group of friends using the social networking platform. At step 204, information relating to the event may be obtained. The information may be obtained by for example, one or more advertiser computers 106 (FIG. 1) and/or one or more server computers 108 (FIG. 1). In some embodiments, the user may first be presented with an option to allow advertisers to target the event. The user may be presented with incentives in exchange for allowing advertisers to target the event. The user may be provided with, for example, cash, discounts, rewards points, coupons, etc. If the user agrees, information relating to the event, such as for example, date and time of the event, location of the event, the users who will be attending, the content to be watched at the event, etc. may be obtained.

At step 206, using one or more computers, the group of users may be classified as belonging to one or more targeting segments based at least in part on the information relating to the event. In some embodiments, the users may be classified into targeting segments such that one or more targeting segments represent all of the users in the group. In some embodiments, each user of the group may be classified into one or more individual targeting segments. Then, one or more shared targeting segments which are common among all of the users may be selected to represent the group of users. Alternatively, one or more users may be classified into one or more targeting segments. For example, only the host of the event may be classified into one or more targeting segments.

At step 208, using one or more computers, one or more advertisements may be selected based at least in part on the one or more targeting segments. For example, if the group includes users who all like video games, then video game advertisements may be selected. At step 210, using one or more computers, the one or more advertisements may be transmitted such that the one or more advertisements are displayed on the television. In some embodiments, the television may be a Connected TV or a Smart TV, which is configured to directly access the Internet. If so, the advertisements may be transmitted to the TV, and subsequently displayed on the TV. In some embodiments, the TV may be connected to a device such as for example, a set-top box or a gaming console which is configured to access the Internet. In such cases, the advertisements may be transmitted to the device (e.g., set-top box or gaming console), and subsequently displayed on the TV. The advertisements may be transmitted before, during or after the event, and may be displayed before, during or after the event.

Figure 3:
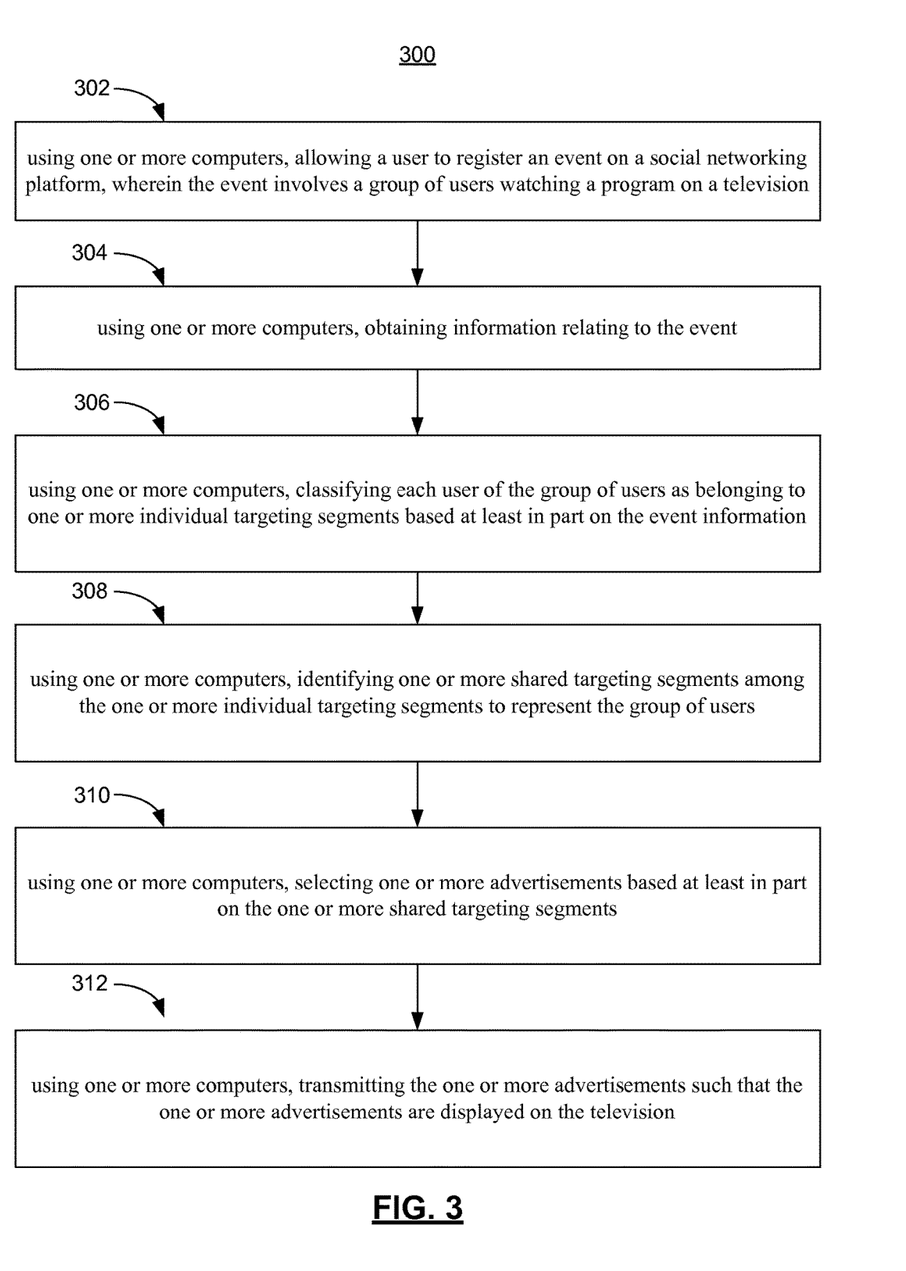
FIG. 3 is a flow diagram illustrating a method according to one embodiment of the invention.

FIG. 3 is a flow diagram illustrating a method 300 according to one embodiment of the invention. At step 302 using one or more computers, a user may be allowed to register an event on a social networking platform, wherein the event involves a group of users watching a program on a television. The user may register the event on a social networking platform (e.g., Facebook, Evite, etc.) in order to invite a group of friends to the event. For example, a user may register a superbowl viewing party on a social networking platform and invite a group of friends using the social networking platform. At step 304, information relating to the event may be obtained. The information may be obtained by for example, one or more advertiser computers 106 (FIG. 1) and/or one or more server computers 108 (FIG. 1). In some embodiments, the user may be presented with an option to allow advertisers to target the event. The user may be presented with incentives in exchange for allowing advertisers to target the event. The user may be provided with, for example, cash, discounts, rewards points, coupons, etc. If the user agrees, information relating to the event, such as for example, date and time of the event, location of the event, the users who will be attending, the content to be watched at the event, etc. may be obtained.

At step 306, using one or more computers, each user of the group of users may be classified as belonging to one or more individual targeting segments based at least in part on the event information. Then, at step 308, using one or more computers, one or more shared targeting segments which are common among the one or more individual targeting segments may be identified to represent the group of users.

At step 310, using one or more computers, one or more advertisements may be selected based at least in part on the one or more shared targeting segments. For example, if the group includes users who all like video games, then video game advertisements may be selected. At step 312, using one or more computers, the one or more advertisements may be transmitted such that the one or more advertisements are displayed on the television. In some embodiments, the television may be a Connected TV or a Smart TV, which is configured to directly access the Internet. If so, the advertisements may be transmitted to the TV, and subsequently displayed on the TV. In some embodiments, the TV may be connected to a device such as for example, a set-top box or a gaming console which is configured to access the Internet. In such cases, the advertisements may be transmitted to the device (e.g., set-top box or gaming console), and subsequently displayed on the TV. The advertisements may be transmitted before, during or after the event, and may be displayed before, during or after the event.

Figure 4:
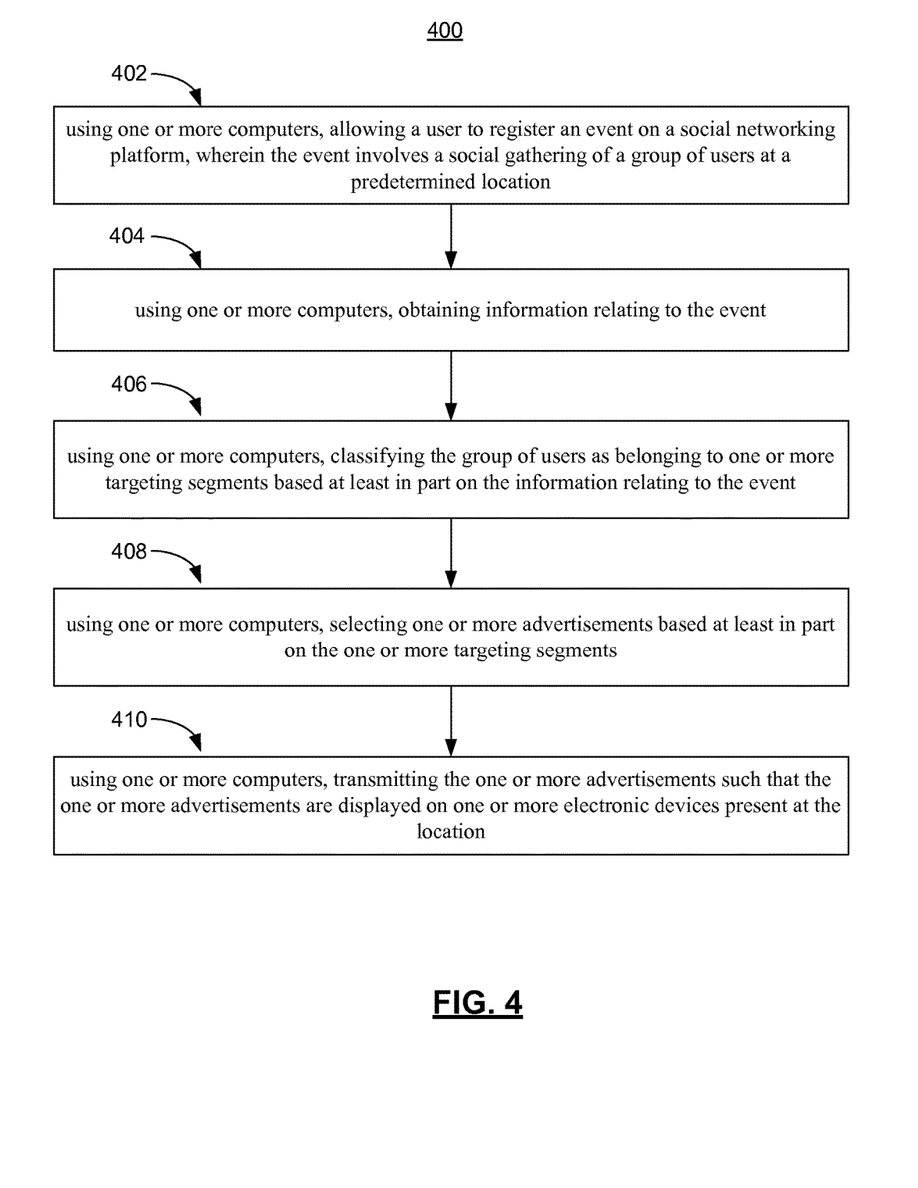
FIG. 4 is a flow diagram illustrating a method according to one embodiment of the invention.

FIG. 4 is a flow diagram illustrating a method 400 according to one embodiment of the invention. At step 402, using one or more computers, a user may be allowed to register an event on a social networking platform, wherein the event involves a social gathering of a group of users at a predetermined location.

At step 404, using one or more computers, information relating to the event may be obtained. At step 406, using one or more computers, the group of users may be classified as belonging to one or more targeting segments based at least in part on the information relating to the event. In some embodiments, the users may be classified into targeting segments such that one or more targeting segments represent all of the users in the group. Alternatively, one or more users may be classified into one or more targeting segments. For example, only the host of the event may be classified into one or more targeting segments.

At step 408, using one or more computers, one or more advertisements may be selected based at least in part on the one or more targeting segments. For example, if the group includes users who all like video games, then video game advertisements may be selected. At step 410, using one or more computers, the one or more advertisements may be transmitted such that the one or more advertisements are displayed on one or more electronic devices present at the location. The one or more electronic devices may include, for example, a television, PC, tablet, smart phone, etc. For example, the one or more advertisements may be transmitted such that they are displayed on one or more smart phones of one or more users of the group. Similarly, the one or more advertisements may be transmitted for display on any number or type of devices which are configured to access the Internet. In some embodiments, if the device is not configured to access the Internet, such as for example, a non-Smart or non-Connected TV, the advertisements may be transmitted to a device (e.g., set-top box or gaming console) which has Internet connectivity, and is connected to the TV. The advertisements may then be subsequently displayed on the TV. The advertisements may be transmitted before, during or after the event, and may be displayed before, during or after the event.

Figure 5:
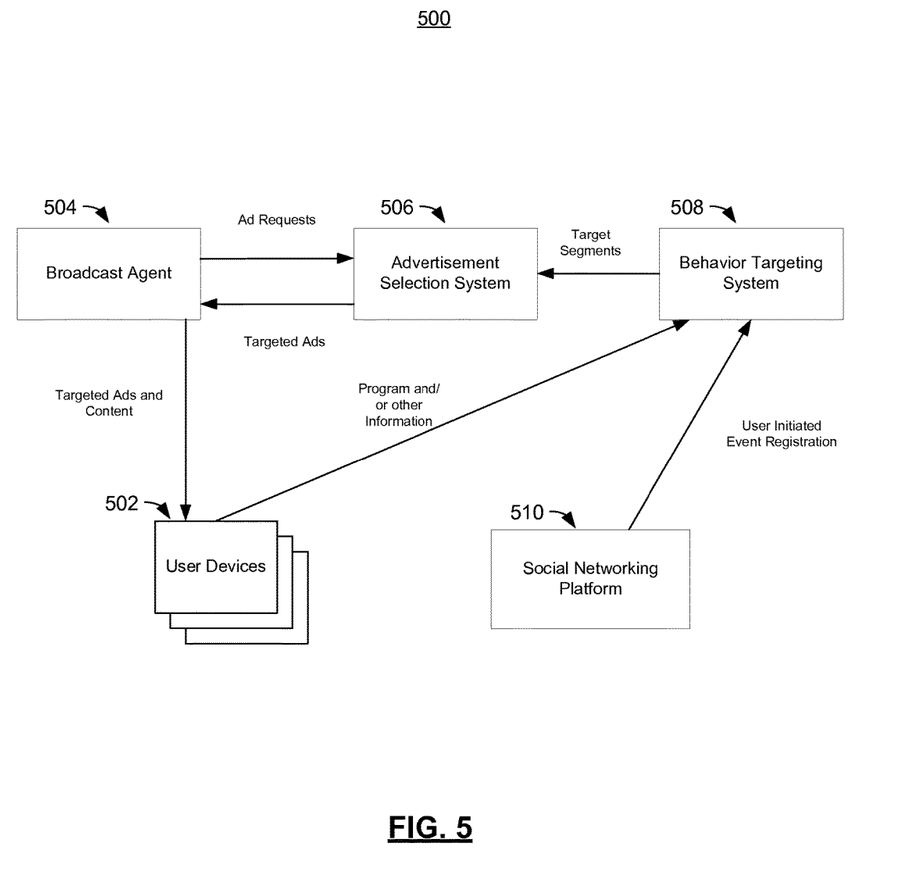
FIG. 5 is a block diagram illustrating one embodiment of the invention.

FIG. 5 is a block diagram 500 illustrating one embodiment of the invention. Exemplary embodiments of the invention allow a user who is hosting a social event, to register and/or schedule the event using a social networking platform 510. The event may involve a group of users watching a program on a television. Information relating to the event, such as for example, date and time of the event, location of the event, the users who will be attending, the content to be watched at the event, etc. may be provided to a behavior targeting system 508. In some embodiments, the user may be presented with an option to allow advertisers to target the event. The user may be presented with incentives in exchange for allowing advertisers to target the event. The user may be provided with, for example, cash, discounts, rewards points, coupons, etc. Behavior targeting system 508 may include, for example, advertiser computers 106 (FIG. 1) and/or one or more server computers 108 (FIG. 1). Behavior targeting system 508 may classify users as belonging to one or more targeting segments based on for example, the information relating to the event obtained from social networking platform 510, and/or information obtained from user devices 502. The information obtained from user devices 502 may include for example, the channel currently being watched, the duration the channel has been watched, the program being watched, etc. User devices 502 may include for example, a Connected TV.

Advertisement selection system 506, which may include for example, advertiser computers 106 (FIG. 1) and/or one or more server computers 108 (FIG. 1), may select one or more advertisements based on one or more shared user segments. The shared user segments may be common among the individuals of the group. Broadcast Agent 504 may be for example, a service provider which streams programming content, and/or related meta-data to user devices 502. User devices 502 may include a Connected TV or a Smart TV, which is configured to directly access the Internet. In some embodiments, user devices 502 may also include one or more devices which may be connected to a TV such as for example, a set-top box or a gaming console which is configured to access the Internet. Advertisements may be requested by broadcast agent 504, and then pushed to user devices 502 at a predetermined time.

Figure 6:
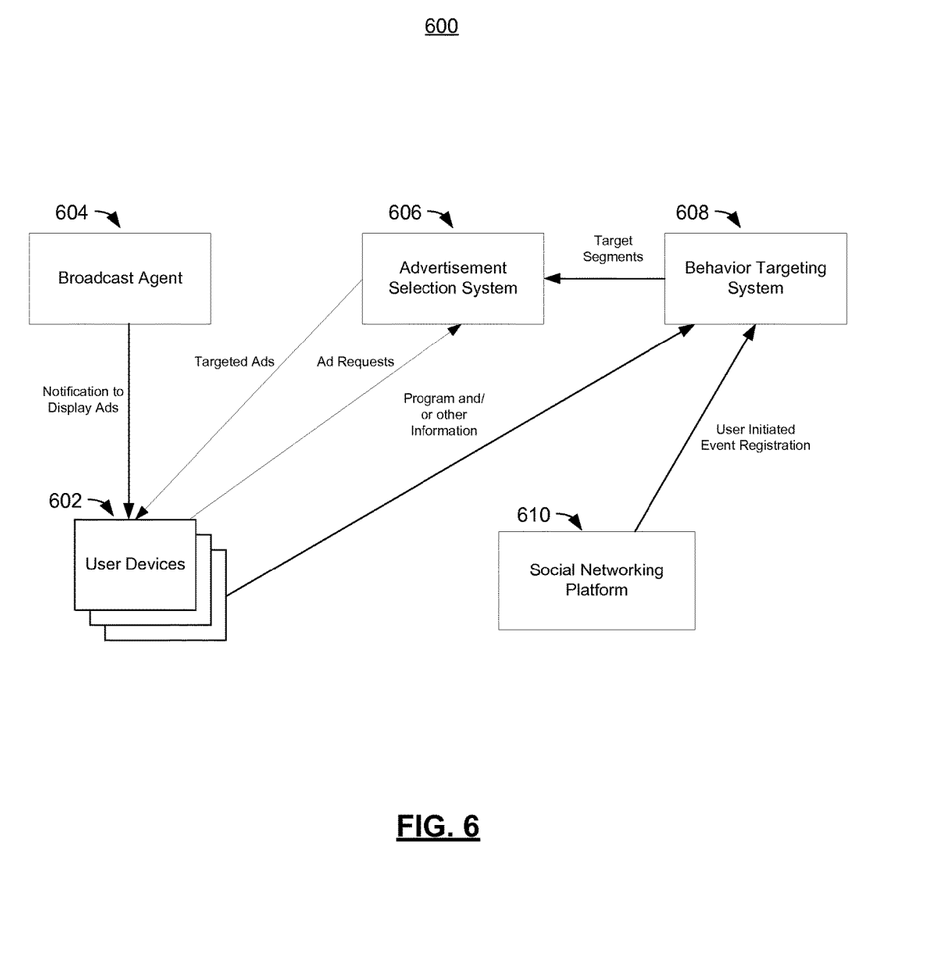
FIG. 6 is a block diagram illustrating one embodiment of the invention.

Alternatively, as shown in FIG. 6, broadcast agent 604 may notify user devices 602 that one or more advertisements should be displayed for a predetermined duration at a predetermined time. User devices 602 may then request one or more advertisements directly from advertisement selection system 606. Advertisement selection system 606 may transmit the one or more advertisements to user devices 602. The advertisements may be transmitted before, during or after the event, and may be displayed before, during or after the event.

While the invention is described with reference to the above drawings, the drawings are intended to be illustrative, and the invention contemplates other embodiments within the spirit of the invention.

The invention claimed is:

1. A computerized method comprising:
receiving over the Internet, user initiated event registration information of an event from a user, the event created by using a social networking platform, and the user initiated event registration information obtained from the social networking platform, the event involving a future plan for a social networking event group of users to watch a program on an Internet connected user device, wherein the device is configured to cause display of television programs, and the device includes a television or a television connected device, and the user initiated event registration information including a selection of an option for advertisers to target the social networking event group of users at the event, and a predetermined location of the event and wherein the social networking event group of users are invited to attend the event via the social networking platform and register to the event via the social networking platform;
obtaining programming content information relating to the event from the one or more electronic devices of the one or more individual users of the social networking event group including the Internet connected user device configured to display television programs, wherein the programming content information includes meta-data related to programming content, a channel currently being watched, a duration the channel has been watched, and a program being watched;
classifying each user of the social networking event group of users as belonging to one or more targeting segments based at least in part on the information obtained from the social networking platform and information obtained from one or more electronic devices of the one or more individual users of the social networking event group present at the event, including the programming content information relating to the event and classifying a host of the event into a particular targeting segment;
selecting one or more advertisements based at least in part on the one or more targeting segments and interests of the users present at the event, wherein the targeting segments are shared by each user of the social networking event group of users;
determining one or more individual users of the social networking event group of users registered to the event being present at the predetermined location of the event based on the one or more electronic devices of the one or more individual users of the social networking event group;
sending by a broadcast agent to the user devices related meta-data and a notification to display the selected advertisements at a predetermined time for a predetermined duration, wherein the broadcast agent includes a service provider for streaming programming content and the related meta-data to the user devices;
selecting, by one or more computers, a display approach for the one or more advertisements that causes the one or more advertisements to be targeted to the social networking event group of users collectively by displaying on the Internet connected user device configured to display television programs and to one or more individual users of the social networking event group of users when present at the predetermined location of the event by displaying on the one or more electronic devices of the one or more individual users of the social networking event group;

requesting the selected advertisements by the user devices at the predetermined time from an advertisement selection system; and transmitting the one or more advertisements to the user devices such that the one or more advertisements, based on shared targeting segments and interests of the users present in the group, are displayed on the Internet connected user device present at the predetermined location and the at least one other user device in accordance with the display approach.

2. The method of claim 1, wherein the information relating to the event comprises time of the event, date of the event, users who are attending the event, and content being watched at the event.

3. The method of claim 2, further comprising:
using one or more computers, classifying each user of the social networking event group of users as belonging to one or more individual targeting segments based at least in part on the event information.

4. The method of claim 3, further comprising:
using one or more computers, identifying one or more shared targeting segments among the one or more individual targeting segments to represent the social networking event group of users.

5. The method of claim 1, wherein the television is operably connected to a gaming console configured to access the Internet.

6. The method of claim 1, wherein transmitting the one or more advertisements further comprises:
transmitting the one or more advertisements during the event.

7. The method of claim 1, wherein the one or more advertisements are transmitted in response to a request from the television.

8. The method of claim 1, wherein the display approach includes pushing the one or more advertisements to one of the television or a device connected to the television and to at least one other user device that is determined to be present at the same predetermined location as the event and associated with an individual user of the social networking event group of users such that the one or more advertisements are displayed at a predetermined time on the television and on the at least one other user device.

9. The method of claim 1, wherein the display approach includes generating a notification to one of the television or the device connected to the television and the at least one other user device such that the notification causes the television and the at least one other user device to display the one or more advertisements for a predetermined duration at a predetermined time.

10. A system comprising:
one or more server computers coupled to a network; and
one or more databases coupled to the one or more server computers;
the one or more server computers being configured to:
receiving over the Internet, user initiated event registration information of an event from a user, the event created by using a social networking platform, and the user initiated event registration information obtained from the social networking platform, the event involving a future plan for a social networking event group of users to watch a program on an Internet connected user device, wherein the device is configured to cause display of television programs, and the device includes a television or a television connected device, and the user initiated event registration information including a selection of an option for advertisers to target the social networking event group of users at the event, and a predetermined location of the event and wherein the group of users are invited to attend the event via the social networking platform and register to the event via the social networking platform;

obtain programming content information relating to the event from the one or more electronic devices of the one or more individual users of the social networking event group including the Internet connected user device configured to display television programs, wherein the programming content information includes meta-data related to programming content, a channel currently being watched, a duration the channel has been watched, and a program being watched;

classify each user of the social networking event group of users as belonging to one or more targeting segments based at least in part on the information obtained from the social networking platform and information obtained from one or more electronic devices of the one or more individual users of the social networking event group present at the event, including the programming content information relating to the event and classifying a host of the event into a particular targeting segment;

select one or more advertisements based at least in part on the one or more targeting segments, wherein the targeting segments and interests of the users present at the event are shared by each user of the social networking event group of users;

determine one or more individual users of the social networking event group of users registered to the event being present at the predetermined location of the event based on the one or more electronic devices of the one or more individual users of the social networking event group;

send by a broadcast agent to the user devices related meta-data and a notification to display the selected advertisements at a predetermined time for a predetermined duration, wherein the broadcast agent includes a service provider for streaming programming content and the related meta-data to the user devices;

select a display approach for the one or more advertisements that causes the one or more advertisements to be targeted to the social networking event group of users collectively by displaying on the Internet connected user device configured to display television programs and to one or more individual users of the social networking event group of users when present at the predetermined location of the event by displaying on the one or more electronic devices of the one or more individual users of the social networking event group;

request the selected advertisements by the user devices at the predetermined time from an advertisement selection system; and transmit the one or more advertisements to the user devices such that the one or more advertisements, based on shared targeting segments and interests of the users present in the group, are displayed on the Internet connected user device present at the predetermined location and the at least one other user device in accordance with the display approach.

11. The system of claim 10, wherein the information relating to the event comprises time of the event, date of the event, users who are attending the event, and content being watched at the event.

12. The system of claim 11, wherein the one or more server computers are further configured to:
classifying each user of the social networking event group of users as belonging to one or more individual targeting segments based at least in part on the event information.

13. The system of claim 12, wherein the one or more server computers are further configured to:
identify one or more shared targeting segments among the one or more individual targeting segments to represent the social networking event group of users.

14. The system of claim 10, wherein the television is operably connected to a gaming console configured to access the Internet.

15. The system of claim 10, wherein transmitting the one or more advertisements further comprises:
transmitting the one or more advertisements during the event.

16. The system of claim 10, wherein the one or more advertisements are transmitted in response to a request from the television.

17. The system of claim 10, wherein the one or more server computers are further configured to:
offer the user one or more of cash, discounts, and coupons for registering the event and for advertisers to target the social networking event group of users at the event.

18. A computer program product embedded in a non-transitory computer readable medium or media containing instructions executable by a computer processor for executing a method comprising:
receiving over the Internet, user initiated event registration information of an event from a user, the event created by using a social networking platform, and the user initiated event registration information obtained from the social networking platform, the event involving a future plan for a social networking event group of users to watch a program on an Internet connected user device, wherein the device is configured to cause display of television programs, and the device includes a television or a television connected device, and the user initiated event registration information including a selection of an option for advertisers to target the social networking event group of users at the event, and a predetermined location of the event and wherein the social networking event group of users are invited to attend the event via the social networking platform and register to the event via the social networking platform;
obtaining programming content information relating to the event from the one or more electronic devices of the one or more individual users of the social networking event group including the Internet connected user device configured to display television programs, wherein the programming content information includes meta-data related to programming content, a channel currently being watched, a duration the channel has been watched, and a program being watched;
classifying each user of the social networking event group of users as belonging to one or more individual targeting segments based at least in part on the information obtained from the social networking platform and information obtained from one or more electronic devices of the one or more individual users of the social networking event group present at the event, including the programming content information and event information and classifying a host of the event into a particular targeting segment;
identifying one or more shared targeting segments among the one or more individual targeting segments to represent the social networking event group of users;
selecting one or more advertisements based at least in part on the one or more shared targeting segments and interests of the users present at the event;
determining one or more individual users of the social networking event group of users registered to the event being present at the predetermined location of the event based on the one or more electronic devices of the one or more individual users of the social networking event group;
sending by a broadcast agent to the user devices related meta-data and a notification to display the selected advertisements at a predetermined time for a predetermined duration, wherein the broadcast agent includes a service provider for streaming programming content and the related meta-data to the user devices;
selecting, by one or more computers, a display approach for the one or more advertisements that causes the one or more advertisements to be targeted to the social networking event group of users collectively by displaying on the Internet connected user device configured to display television programs and to one or more individual users of the social networking event group of users when present at the predetermined location of the event by displaying on the one or more electronic devices of the one or more individual users of the social networking event group;
requesting the selected advertisements by the user devices at the predetermined time from an advertisement selection system; and
transmitting the one or more advertisements to the user devices such that the one or more advertisements, based on shared targeting segments and interests of the users present in the group, are displayed on the Internet connected user device present at the predetermined location and the at least one other user device in accordance with the display approach.

* * * * *